Feb. 13, 1973   C. K. N. PATEL   3,716,747
TELEVISION CAMERA TUBE UTILIZING LIGHT BEAM SCANNING

Filed Sept. 4, 1970

INVENTOR
C. K. N. PATEL
BY Michael J. Urbano
ATTORNEY

United States Patent Office
3,716,747
Patented Feb. 13, 1973

3,716,747
TELEVISION CAMERA TUBE UTILIZING LIGHT BEAM SCANNING
Chandra Kumar Naranbhai Patel, Summit, N.J., assignor to Bell Telephone Laboratories, Incorporated, Murray Hill and Berkeley Heights, N.J.
Filed Sept. 4, 1970, Ser. No. 69,539
Int. Cl. H01j 29/46
U.S. Cl. 315—10
11 Claims

ABSTRACT OF THE DISCLOSURE

The target of a television camera tube includes a photoemitter or a photoconductor and a photochromic glass layer disposed between an image being viewed and the source of a scanning laser beam. The image is focused onto one surface of the photochromic glass layer while the scanning beam is made incident on the opposite surface thereof. The beam transmitted through the layer emerges with modulated intensity corresponding to the intensity pattern of the image and then impinges on the photoemitter, for example, to generate free electrons modulated in scan time in accordance with the image intensity pattern. These electrons are collected to produce an electrical signal representative of the image.

BACKGROUND OF THE INVENTION

This invention relates to television camera tubes and, more particularly, to such camera tubes employing light beam scanning of the target.

In conventional camera tubes the resistivity of a photosensitive target, such as antimony trisulphide, changes in accordance with a light image focused onto one surface thereof. These changes in resistivity are sensed by a scanning electron beam to produce an electrical signal representative of the image being viewed. One problem inherent in such camera tubes is that the resolution attainable is limited by the restricted ability to focus the electron beam. In addition, the useful life of prior art camera tubes is reduced by deterioration of the target caused not only by the constant bombardment of high energy electrons but also by such phenomena as burn-in produced by intense infrared radiation (e.g., photoflash illumination). The electron beam may also reduce the tube life by causing atoms (e.g., sulphur from the target) or ions (from spurious gases in the tube) to strike the extremely sensitive surface of the thermionic cathode thereby increasing its work function and decreasing electron emission. Moreover, the target of conventional camera tubes is adversely affected by nuclear or thermal radiation and the complex tube itself is extremely sensitive to shock and vibration.

It is therefore one object of this invention to provide a compact television camera tube with improved resolution and/or extended useful life.

It is another object of this invention to provide a camera tube which is relatively insensitive to nuclear or thermal radiation.

It is yet another object of this invention to provide a television camera tube which is highly resistant to shock and vibration.

SUMMARY OF THE INVENTION

These and other objects of the invention are accomplished in accordance with one embodiment of the invention in which the target of a camera tube includes a layer of a photochromic glass the optical density of which is proportional to the intensity of light being imaged on it at any particular point. A light image is focused onto one surface of the photochromic layer and a scanning laser beam is made incident on its opposite surface, with the result that the intensity of the beam transmitted through the layer is modulated in accordance with the light intensity pattern of the image.

The beam so modulated may be detected in several ways. In one case, the beam impinges upon a photoemissive layer to generate in space free electrons modulated in scan time in accordance with the image. These electrons are collected by means of an optically transparent collector layer, usually metallic, disposed between the photoemissive and photochromic layers. These layers are, of course, all appropriately mounted in a vacuum jacket or envelope in order that gases in the atmosphere not be ionized by the free electrons. Alternatively, the collector may be formed in the shape of a hollow ring or cylinder, the modulated light beam passing longitudinally therethrough and impinging thereafter on the photoemitter. In the latter case the collector is not limited by the requirement that it be transparent to the laser beam wavelength.

In another embodiment, the entire structure may be solid state and the vacuum jacket eliminated by substituting a photoconductor in place of the photoemitter and collector. In this case, the modulated laser beam impinges on the photoconductor and generates directly therein an electric current proportional to the image intensity pattern.

In each of these embodiments long useful life is attainable especially if a solid state laser is employed. Furthermore, high resolution is attainable, being limited only by the size of the laser spot which scans the photochromic layer. The latter characteristic arises from the small grain size in the photochromic layer which causes the layer to appear as a continuous material. Consequently, the scanning beam need not impinge upon a well-defined spot to produce subsequently photoelectrons from the photoconductor or photoemitter.

BRIEF DESCRIPTION OF THE DRAWING

These and other objects of the invention, together with its various features and advantages, can be more easily understood from the following more detailed description taken in conjunction with the accompanying drawing, in which.

DETAILED DESCRIPTION

Figure 1:
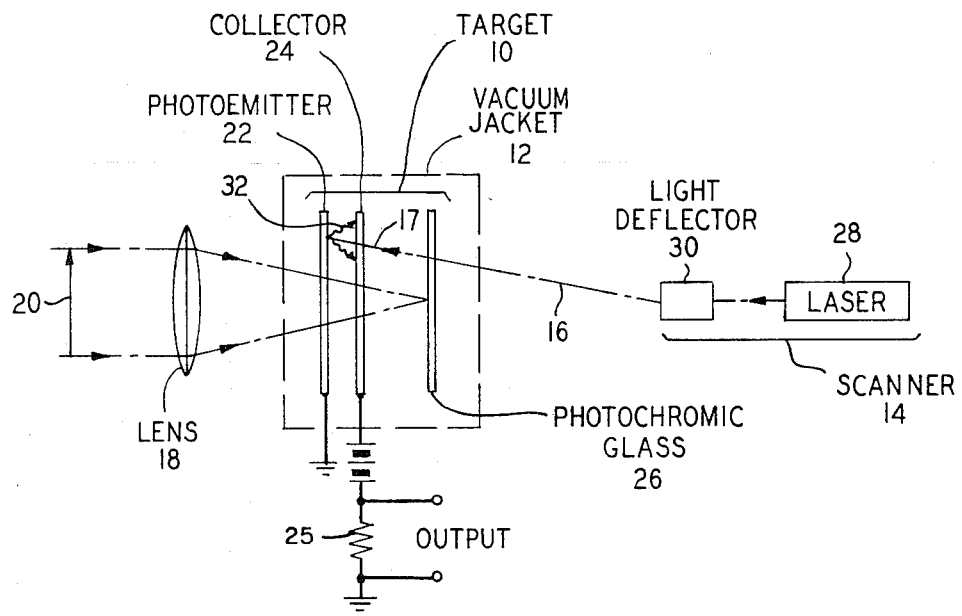
FIG. 1 is a schematic of a television camera tube in accordance with one embodiment of the invention employing a photoemitter.

Before discussing the invention in detail, a brief discussion of photochromism will be presented. Photochromism is the restrictive case of phototropism in which at least one of the states absorbs visible light. Phototropism is defined as a spontaneously reversible change of a single chemical species between two states having different absorption spectra with the change induced in at least one direction by electromagnetic radiation. All photochromic materials exhibit fading which can be as fast as microseconds or as slow as days depending on the particular substance.

Photochromic materials can be divided into two general classes: organic and inorganic. The organic class includes such materials as stero-isomers in which absorption of light breaks one of the chemical bonds in a ring molecule to produce a different geometrical arrangement of atoms or molecules. The fade time of this class of materials can be as short as a few microseconds. Typical materials are spiropyrans and anils. Other organic photochromic materials include dyes such as triphenyl methyl dye which is oxidized by energetic light. In these dyes the fade time can be as short as a few thousandths of a second. Yet another class of organics are polynuclear aromatic hydrocarbons in which exciting light converts a singlet ground state into an excited triplet state and the subsequent absorption of light by the triplet state gives rise to the photochromic effect. The fade time of the materials is also as short as a microsecond.

In organic materials, on the other hand, include alkaline earth sulfides such as manganese or bismuth, zinc sulfide, titania and alkaline earth titanites, mercury compounds and others.

All of these materials, both the organic and inorganic, can be included in a glass or a plastic matrix to form the desired photochromic target. The triplet state organic materials are particularly advantageous in this respect since it is relatively easy to tailor the image-forming wavelength and the wavelength at which absorption of the material increases.

Photochromic glasses are of three general types: hackmanite, glass including cerium or europium, and glass including silver halide particles. Of these three, photochromic glasses including silver halide are preferred from the standpoint of glass qualities and photochromic behavior. Typically, an alkali borosilicate glass is doped with silver halide particles of average diameter of 100 A. and a doping concentration of the order of 0.2%. This corresponds to a concentration of about $4 \times 10^{15}$ particles per cubic centimeter. In other words, the spacing between the particles is of the order of 600 A. Thus, the minimum resolvable spot is about 600 A. Since it is not possible to focus a laser beam which scans the photochromic glass to this small a dimension, the resolution will be limited not by the photochromic glass itself but by the optics of the camera tube. Consequently, the resolution will be of the order of half the wavelength of the light beam in the glass matrix, i.e., in the range of 2000–3000 A. The photochromic glass camera tube in accordance with the instant invention, therefore, can resolve ideally in excess of about 10,000 spots per linear centimeter or approximately 100 million spots sper square centimeter. This resolution far exceeds that of currently available conventional camera tubes. Of course, the resolution can be further improved by using a shorter wavelength scanning laser.

Turning now to FIG. 1, there is shown schematically a television camera tube in accordance with an illustrative embodiment of the invention comprising a multilayered target 10 housed in a vacuum jacket or envelope 12. a scanner 14 for scanning a light beam 16 across the target, and a lens or lens system 18 for focussing an image 20 onto the target. While scanner 14 is shown disposed exterior to the vacuum envelope 12 it is of course readily possible to position it interior thereto as design considerations might dictate.

The multilayered target 10 (which may be fabricated in integrated or spaced-apart form) includes a photoemissive member 22, an optically transparent collector member 24 and a photochromic glass member 26 disposed in the order recited between the image 20 and the scanner 14. The photoemitter 22 is electrically grounded whereas the collector 24 is maintained at a positive potential and is connected through a resistor 25 to ground, the output of the camera tube being taken across resistor 25. Scanner 14 comprises a laser 28, the output beam of which is scanned by means of light deflector 30, typically an electrooptic crystal.

The photochromic glass member 26 is characterized by the property that within a particular wavelength range its optical density (i.e., its absorption measured with respect to the logarithmic base ten) is proportional to the intensity of light being imaged on its at any particular point. The laser beam wavelength should, therefore, preferably be outside that wavelength range so that the beam intensity does not itself alter significantly the optical density of photochromic member 26, i.e., the beam should not introduce an objectionable form of noise or distortion into the system. In addition, the laser wavelength should preferably fall within the range of high photomissivity of photoemitter 22 in order that enough free electrons are created by the impinging laser beam 16 that a reasonably high signal-to-noise ratio is attained.

In operation, a light image 20 is focussed by lens 18 onto the front surface of photochromic glass member 26, thereby altering its optical density in accordance with the intensity pattern of the image. Concurrently, light deflector 30 scans laser beam 16 across the back surface of photochromic member 26. The resultant beam 17 transmitted through member 26 is intensity modulated in accordance with the image intensity pattern, passes through transparent collector 24 (highly transmissive at the laser wavelength and the image wavelengths) and impinges upon photoemitter 22, thereby to generate free electrons 32 modulated in scan time in accordance with the image intensity pattern. These free electrons are collected by collector member 24 in the conventional manner to produce an electric current therein and a resultant voltage across output resistor 25.

The following materials and parameters are given for the purposes of illustration only and are not to be construed as limitations on the scope of the invention. Scanner 14 typically comprises a He:Cd laser 28 operating at about 3250 A. Light deflector 30 illustratively includes one or more LiNbO$_3$ crystals, associated electrodes, voltage sources and crystal alignment with respect to the laser beam polarization, all of which are well known in the art and will not be repeated here in the interest of simplicity. Collector 24 on the other hand is typically a transparent silver layer whereas photoemitter 32 comprises a rubidium telluride layer to produce photoelectrons efficiently at the wavelength of 3250 A. Finally photochromic glass member 26 illustratively comprises, as discussed previously, an alkali borosilicate glass doped with silver halide particles having the aforementioned optical density versus light intensity characteristic in the wavelength range of about 4000 A. to 7000 A.

Figure 2:
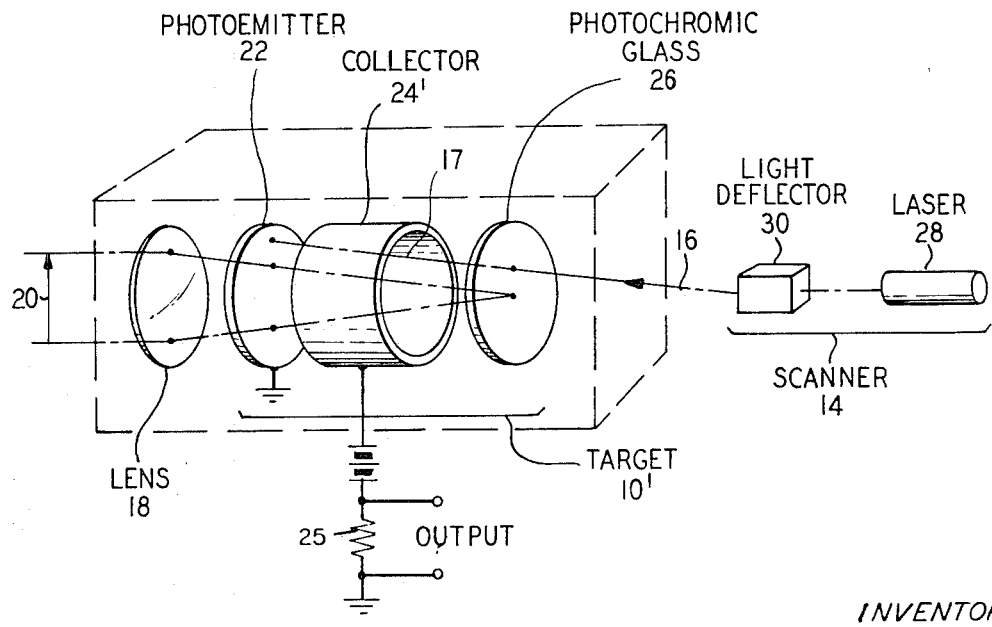
FIG. 2 is a pictorial view of another embodiment of the invention employing a photoemitter in combination with a cylindrical collector.

In a second embodiment of the invention, the requirement that the collector be transparent to the laser and image wavelengths is eliminated by fabricating the collector 24', as shown in FIG. 2, in the form of a hollow cylinder or ring instead of in the form of a planar disk as shown in FIG. 1. Thus, the modulated light beam 17 after being transmitted through photochromic member 26 passes through the interior of collector 24' and then impinges upon photoemitter 22. In the case of either type of collector, the material from which it is fabricated should preferably be a metal relatively free from secondary electron emission.

Both of the embodiments of FIGS. 1 and 2 require the use of a low pressure environment created by vacuum jacket 12 since free electrons created in the atmosphere surrounding the target would disadvantageously ionize gases in the environment. This structure can, however, be eliminated by substituting in target 10'', shown in FIG. 3A, a photoconductor (e.g., zinc sulphide which is responsive at wavelengths shorter than about 3500 A.) for the photoemitter 22 and corresponding collector 24 or 24'. In this case, intensity modulated beam 17 after being transmitted through photochromic glass member 26 impinges on photoconductor 17 to generate an electric current therein modulated in scan time in accordance with the image intensity pattern.

In all of the foregoing embodiments it is of course implicit that the photoemissive and photoconductive layers are transparent to the image 20. In addition, the collector 24 of FIG. 1 is similarly transparent. If, however, either the photoemitter or the photoconductor is responsive to the visible image (e.g., the photoemitter is an S1 surface such as AgOCs or the photoconductor is Si or Ge) then the embodiment of FIG. 4, to be described hereinafter, should be employed.

Figure 3A:
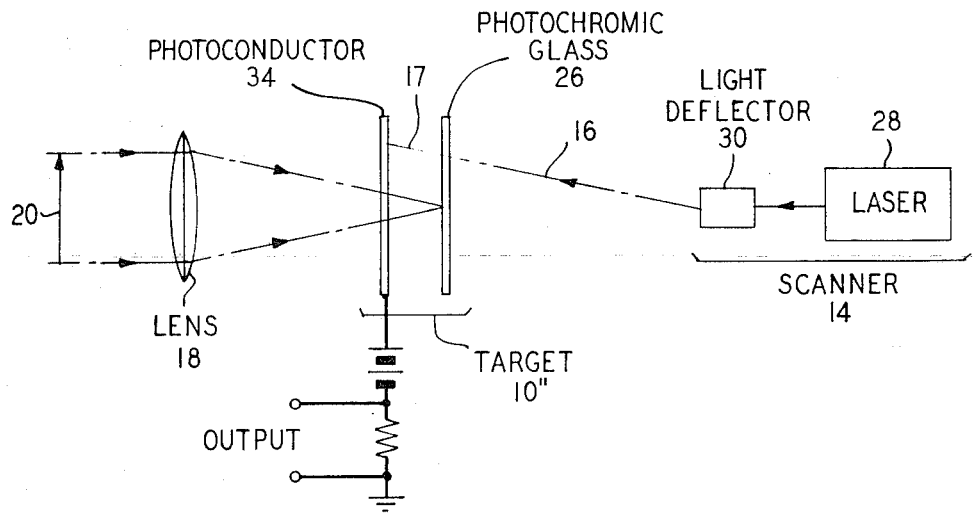
FIG. 3A is a schematic of a third embodiment of the invention employing a photoconductor.
Figure 3B:
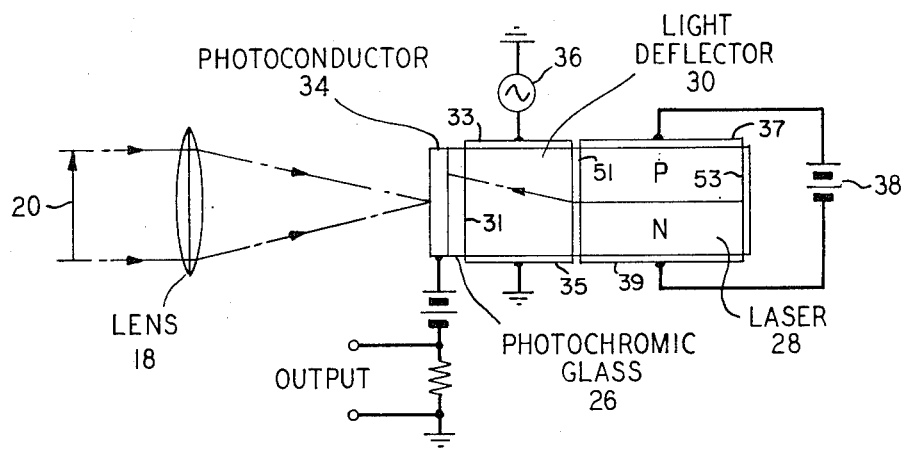
FIG. 3B is a schematic of an illustrative unitary structure of the embodiment of FIG. 3A.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, the embodiment of FIG. 3A is especially adaptable to fabrication in a unitary structure as shown in FIG. 3B. The photoconductor 34 and photochromic glass layer 26 are fabricated contiguous with another, layer 26 being deposited or otherwise formed on a transverse major surface 31 of an electrooptic crystal (light deflector 30). Parallel longitudinal surfaces of crystal 30 are provided with electrodes 33 and 35 to enable the connection thereacross of a single source 36 which creates in crystal 30 an electric field to modulate its index of refraction and thereby to produce beam scanning of the output of laser 28. The latter is shown illustratively to comprise a p-n junction laser (e.g., a GaAs laser operating at about 8400 A. to 9000 A.) having electrodes 37 and 39 on the p and n regions, respectively, to enable the connection of a forward bias source 38 shown illustratively to be a battery. Laser 28 is also provided with a cavity resonator formed by opposite parallel surfaces 51 and 53 (e.g., actual mirrors or, more commonly, cleaved surfaces of the semiconductor body itself). Surface 51 is made to be partially transmissive in order to couple radiation out of laser 28 into crystal 30. In addition, for well-known reasons of transverse mode control and improved thermal characteristics, the electrode 37 is typically formed in the shape of a stripe.

Figure 4:
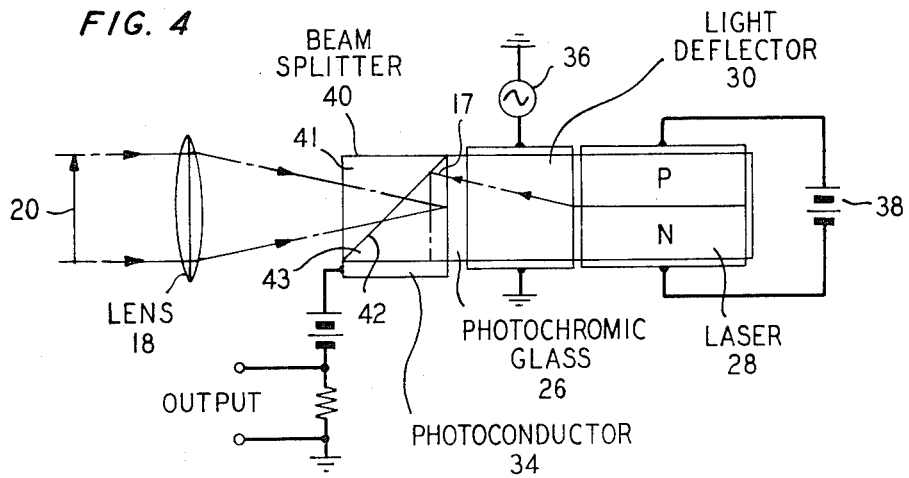
FIG. 4 is a schematic of another embodiment of the invention.

As mentioned previously, where the photoconductor (or photoemitter as the case may be) is responsive to the visible image, then it may be positioned, as shown in FIG. 4, so that image 20 is not incident thereon. In this embodiment, junction laser 28, light deflector 30 and photochromic glass member 26 are arranged as in FIG. 3B. Photoconductor 34 (or other appropriate detector), however, is disposed so as to receive the modulated laser beam 17 only after it is deflected by beam splitter 40. The latter typically comprises a pair of prisms 41 and 43 having a high reflectivity coating (at the laser wavelength) at their interface 42. Thus, visible radiation is not incident on the photoconductor and therefore cannot introduce noise therein, whereas the modulated beam is reflected at interface 42 to incidence on photoconductor 34 shown to be formed contiguous with a bottom surface of prisms 43. Alternatively, beam splitter 40 could be a Rochon prism if the laser beam polarization is appropriately chosen as is well known in the art. Of course, other solid state lasers, such as a Nd:YAG laser operating at 1.06 μm., can also be used in place of the p-n junction laser depicted in the figures.

What is claimed is:

1. Apparatus for converting an optical image into an electrical representation thereof comprising
   a photochromic glass member the optical density of which in a particular wavelength range and at any point on a surface thereof is proportional to the intensity of said optical image made incident thereon,
   a source of a coherent beam of optical radiation adapted for transmission through said member, the wavelength of said beam of radiation being outside of said range, and said beam after transmission through said member being intensity modulated in accordance with the intensity of said optical image,
   means for scanning said beam across said member, and
   means responsive to said modulated beam for generating electrons modulated in scan time in accordance with the intensity modulation of said modulated beam.

2. The apparatus of claim 1 wherein said electron generating means comprises a photoemissive member for generating free electrons in response to the incidence of said modulated beam and in combination with means for collecting said free electrons to produce an electrical output signal representative of said optical image and means enclosing at least said photoemissive member and said collecting means for maintaining a low atmospheric pressure in the environment of said free electrons.

3. The apparatus of claim 2 wherein said photo emissive is unresponsive to visible radiation from said optical image, is transparent thereto, and is disposed between the source of said image and said coherent beam source so that both said image and said beam are incident thereon.

4. The apparatus of claim 2 wherein said photoemissive member is disposed out of the path of incidence of said image and said beam, and in combination with means for selectively reflecting only said beam to incidence thereon after passage through said photochromic member.

5. The apparatus of claim 2 wherein said photoemissive member is characterized by a wavelength range of high photoemissivity, the wavelength of said beam is within said range, and said collecting means comprises a substantially planar metallic member disposed between said photoemissive member and said photochromic glass member, said metallic member being highly transmissive at the wavelength of said beam and being substantially free of secondary electron emission.

6. The apparatus of claim 2 wherein said photoemissive member is characterized by a wavelength range of high photoemissivity, the wavelength of said beam is within said range, and said collecting means comprises a hollow cylindrical metallic member disposed between said photoemissive member and said photochromic glass member, said modulated beam being transmitted through the hollow portion of said cylindrical member to incidence upon said photoemissive member, said metallic member being substantially free of secondary electron emission.

7. The apparatus of claim 1 wherein said electron generating means comprises a photoconductive member for generating therein an electric current in response to the incidence of said modulated beam, said photoconductive member being characterized by a wavelength range of high photoconductivity, the wavelength of said beam being within said range.

8. The apparatus of claim 7 wherein said photoconductive member is unresponsive to visible radiation from said optical image, is transparent thereto, and is disposed between the source of said image and said coherent beam source so that both said image and said beam are incident thereon.

9. The apparatus of claim 7 in a unitary structure wherein said photoconductive member is contiguous with one surface of said photochromic glass member and is highly transmissive to said image, said scanning means comprises an electrooptic crystal and means for applying thereto an electric field for varying its index of refraction, said crystal having one surface contiguous with the opposite surface of said photochromic glass member, and said source comprises a solid state laser including a pair of oppositely reflecting surfaces defining an optical cavity resonator, one of said reflecting surfaces being partially transmissive to said beam of radiation and being contiguous with the opposite surface of said crystal.

10. The apparatus of claim 7 wherein said photoconductive member is disposed out of the path of incidence of said image and said beam, and in combination with means for selectively reflecting only said beam to incidence thereon after passage through said photochromic member.

11. The apparatus of claim 10 in a unitary structure wherein said reflecting means comprises a pair of prisms highly transmissive to said image and contiguous with one another along an interface adapted to be highly reflecting at the wavelength of said coherent beam source and having at least one lateral surface out of the path of incidence of radiation from said image and at least one transverse surface substantially normal to the incidence of radiation from said source, said photoconductive member being contiguous with said lateral surface, said photochromic glass member being contiguous with said transverse surface, and wherein said scanning means comprises an electrooptic crystal and means for applying thereto an electric field for varying its index of refraction, said crystal having one transverse surface contiguous with said photochromic glass member, and said source comprises a solid state laser including a pair of oppositely reflecting surfaces defining an optical cavity resonator, one of said reflecting surfaces being partially transmissive to said beam of radiation and being contiguous with a transverse surface of said crystal substantially parallel to said one transverse surface, said beam after transmission through said crystal and said photochromic glass member being reflected at said interface to incidence upon said photoconductive member.

References Cited

UNITED STATES PATENTS

| | | | |
|---|---|---|---|
| 3,069,551 | 12/1962 | Haine | 315—10 |
| 2,871,385 | 1/1959 | Roberts | 315—10 |
| 3,402,300 | 9/1968 | Pearl | 315—10 |
| 3,214,702 | 10/1965 | Maurer | 315—10 |

REUBEN EPSTEIN, Primary Examiner

U.S. Cl. X.R.

331—94.5 A; 332—7.51